United States Patent [19]
Umeda et al.

[11] Patent Number: 5,420,850
[45] Date of Patent: May 30, 1995

[54] MOBILE STATION AND CELL SELECTING METHOD FOR CODE DIVISION MULTIPLEX ACCESS MOBILE COMMUNICATION

[75] Inventors: Narumi Umeda, Yokohama; Toyota Nishi, Fuchu; Akihiro Higashi, Yokosuka, all of Japan

[73] Assignee: NTT Mobile Communications Network, Inc., Tokyo, Japan

[21] Appl. No.: 203,396

[22] Filed: Mar. 1, 1994

[30] Foreign Application Priority Data

Mar. 10, 1993 [JP] Japan .................. 5-049318

[51] Int. Cl.⁶ .................................. H04B 1/69
[52] U.S. Cl. ........................ 370/18; 375/205; 455/54.1
[58] Field of Search ............. 370/18, 19, 20, 21, 370/22; 375/1; 455/33.1, 33.2, 33.4

[56] References Cited

U.S. PATENT DOCUMENTS 5,311,544  5/1994  Park et al. .............. 375/1

Primary Examiner—Douglas W. Olms
Assistant Examiner—Huy D. Vu
Attorney, Agent, or Firm—Pollock, VandeSande and Priddy

[57] ABSTRACT

A received signal of a control channel of each cell is despread by each spreading code in a correlation detector. The received level of the despread output in a window, including its peak, is measured in a level measuring part and an interference signal level outside the window is also measured. In a control part the difference or ratio between the measured received level and the interference signal level is obtained as a comparison signal for each spreading code, and the comparison signal is compared in terms of magnitude to thereby determine the visited cell of a mobile station.

8 Claims, 4 Drawing Sheets

MOBILE STATION AND CELL SELECTING METHOD FOR CODE DIVISION MULTIPLEX ACCESS MOBILE COMMUNICATION

BACKGROUND OF THE INVENTION

The present invention relates to a mobile station or mobile terminal equipment of a CDMA (Code Division Multiplex Access) mobile communication system which transmits information spectrum-spread by a spreading code and uses a different spreading code to establish a different channel and, more particularly, to a visited cell selecting arrangement and a cell selecting method for the CDMA mobile communication system.

In a cellular mobile-communication system in which a plurality of cells make up a service area, a base station optimum for communication changes every moment as the mobile station moves or travels. It is therefore necessary, in the mobile communication system, to properly select the base station optimum for communication (i.e. a base station belonging to the cell where the mobile station is currently located) each time the mobile station moves from a certain cell to the adjoining one. This is called a cell determination (or cell selection) and the system which performs communication through a base station selected by such a cell determination is referred to as a cellular system. The cellular system could be implemented using FDMA (Frequency Division Multiplex Access), TDMA (Time Division Multiplex) and CDMA (Code Division Multiplex Access) techniques. In any case, each cell is assigned a plurality of communication channels and at least one control channel.

Whether the cell selected as mentioned above is optimum or not has a great influence on the channel (or system) capacity, the channel quality and so forth. That is, in the event that a cell distant from the mobile station is selected erroneously, both the mobile station and the base station will transmit with power greater than needed when the optimum cell is selected. This increases interference with other stations, wherein the signal to interference signal ratio diminishes, resulting in the channel quality being degraded. Furthermore, the increase in interference causes a decrease in the number of mobile stations that are allowed to communicate simultaneously, and hence reduces the channel capacity.

A description will be given of a cell selecting or determining method used in the conventional cellular system.

The base station of each cell always transmits via the control channel a paging message, the configuration of the control channel, base station identifying information, etc. to the mobile station. Being turned-on, the mobile station sequentially searches control channels listed in its storage corresponding to respective base stations and measures the signal receiving level in each control channel. The mobile station selects a control channel of the highest receiving level among those having receiving levels above a predetermined threshold value and determines that the base station corresponding to the control channel thus selected is an optimum base station (i.e. a base station nearest to the mobile station). The mobile station is set to the state for receiving the control channel of that base station, thus entering the wait state.

In the wait state, the mobile station periodically searches control channels of other cells and consequently other base stations in a sequential order and measures their receiving levels, because it is considered that the base station for optimum communication might change as the mobile station moves. The newly measured receiving level of each of the other control channels is compared with a value that is the sum of the receiving level of the currently-used control channel and a predetermined threshold value, and when the former is higher than the latter, it is determined that the mobile station has proceeded into a different cell, and the control channel for which the mobile station has been set to the wait-state is switched accordingly. In the case of originating a call, the mobile station transmits a call connect request signal to the base station of the cell thus selected.

During communication, too, the mobile station periodically searches the other control channels and measures their receiving levels. The receiving level of each of the other control channels is compared with a value that is the sum of the receiving level of the current control channel and a predetermined threshold value, and when the former is higher than the latter, it is determined that the mobile station has proceeded into a different cell, and the communication channel is switched accordingly.

With the conventional cell determination or selection method, as described above, each mobile station measures the receiving level of the control channel assigned to each cell and compares it with the above-mentioned value to determine the cell in which the mobile station is currently located.

An implementation of the above-said cellular system through use of the CDMA method is disclosed in PCT Application Publication Number WO91/07036 (Application Number: PCT/US90/06417). In the CDMA system predetermined different pseudo random codes (referred to as PN codes or spectrum spreading codes, or simply as spreading codes) are provided corresponding to all channels of each cell such as the aforementioned control channel and communication channels. Each base station multiplies each bit of the signal to be transmitted over the respective channel by the spreading code corresponding to the channel to obtain a spread signal, which is used to modulate a carrier of the same frequency as those of the other base stations.

As is well-known in the art, a PN code sequence can be generated, for example, by EXCLUSIVE ORing the outputs from the last stage and a desired intermediate stage of a shift register composed of n delay stages, inputting the resulting exclusive OR into the first stage of the shift register and driving the shift register with a clock signal of a predetermined period T. In this instance, a random code of a fixed pattern that repeats in a cycle of $2^n-1$ bits (hereinafter called chips to distinguish from bits in information signal) at maximum is obtained depending on which of the intermediate stage outputs is chosen. 1/T is referred to as a chip rate and the period Tp of the pattern that is generated is $Tp=(2^n-1)T$.

The mobile station multiplies (that is, despreads) the received signal by the spreading code corresponding to a desired channel while maintaining the phase relation that maximizes their cross-correlation, by which it is possible to increase the gain of the desired received signal and extract the desired signal. According to the description given in the aforementioned PCT application publication, a control channel is provided for the base station of each cell to transmit a pilot signal which is a base station determining signal, and respective base stations transmit over their control channels using a common spreading code in predetermined different phases. The pilot signal that each base station transmits contains information identifying the base station and information which specifies the spreading code corresponding to the control channel in which to wait for an incoming call in that cell.

The mobile station sequentially shifts the phase of that PN code corresponding to the control channel for the pilot signal which is used to despread the received signal; thus, the mobile station extracts pilot signals from the respective base stations one after another, measures their receiving levels and selects the base station from which the pilot signal of the highest receiving level is received.

In the spread spectrum CDMA system, however, the same frequency is used for all communications and channels are distinguished individually by the spreading codes. On this account, in the case of measuring the receiving level of the control signal from the base station of an arbitrary cell, if the cross-correlation between the received signal spread by the spreading code from the base station (which received signal will hereinafter be referred to as a desired signal) and the received signal spread by the spreading code from another base station (which received signal will hereinafter be referred to as an interference signal) is zero ideally, then the desired signal and the interference signal can completely be isolated from each other, and hence the receiving level of the desired signal can accurately be measured. In practice, however, the cross-correlation between these spread signals does not become zero, and consequently, the desired signal receiving level is added with the interference signal receiving levels in accordance with the values of the cross-correlation and does not reflect the level at which the desired signal was actually received. This applies to the receiving levels of control signals from the other base stations. Accordingly, every communication wave would become an interference signal and an error between the measured value of the receiving level including the interference wave and the receiving level of only the desired wave increases in accordance with the value of cross-correlation between the desired signal received from the desired base station and the signal received from another base station. This increases the possibility of false selection in selecting the base station of the optimum cell by comparing the receiving levels of signals from the base stations of respective cells. Moreover, when a wrong base station is selected, the transmitting power produced by transmitting power control increases more than needed and constitutes a source of serious interference with other communications—this decreases the number of stations that are allowed to communicate simultaneously, and consequently reduces the channel capacity.

SUMMARY OF THE INVENTION

It is therefore an object of the present invention to provide a cell selecting method for the CDMA mobile communication system which permits accurate measurements of the levels of signals received from respective cells and hence ensures the selection of the base station of a cell for optimum communication. The invention also pertains to a mobile station or terminal equipment which utilizes or embodies the cell selecting method.

According to the present invention, received waves are searched using prestored spreading codes for level monitoring use, that is, the received waves are each despread by the corresponding spreading code, and the received level, which is the detected output of their correlation, is measured in a window defined by the timing for a predetermined time width extending across the timing of the peak value of the correlation detected output, while at the same time the levels of waves interfering with the received wave are measured outside the window. Then signals for comparison are produced by removing the influences of the interference levels from the received levels measured for the respective spreading codes, and the signals are compared to determine the visited cell in which the mobile station is currently located.

DESCRIPTION OF THE PREFERRED EMBODIMENTS

Figure 1:
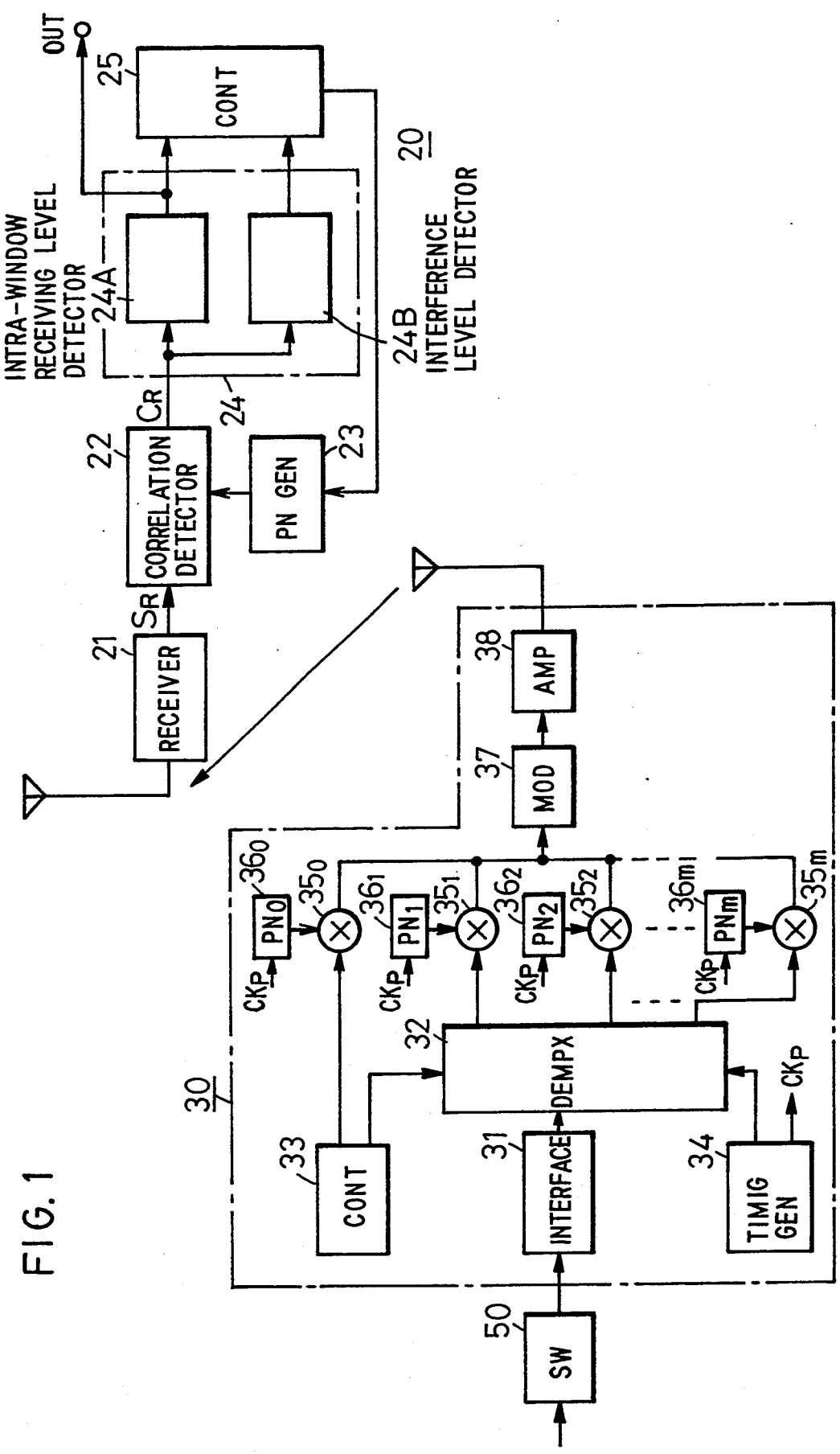
FIG. 1 is a block diagram showing those parts of a mobile station and a base station which are related to the present invention.

FIG. 1 illustrates in block form an embodiment of the mobile station 20 according to the present invention and a base station 30. Since the present invention concerns the reception by the mobile station, there are shown only the transmitting section of the base station 30 and the receiving section of the mobile station 20.

The base station 30 is provided with: a demultiplex part 32 whereby a multiplexed speech signal fed thereto from a switch 50 via an interface 31 is demultiplexed under the control of a control unit 33 for connection to unoccupied or free communication channels; PN code generating parts $36_0$ through $36_m$ for generating spreading codes $PN_0, PN_1, \ldots, PN_m$ of the same code length (of N chips) corresponding to the respective channels; multipliers $35_0$ through $35_m$ for multiplying information of the respective channels by the corresponding spreading codes to generate spectrum-spread information; a modulator 37 for modulating a carrier by a composite signal composed of the spread information; and an amplifier 38 for amplifying the modulated carrier for transmission.

The PN code generating parts $36_0$ through $36_m$ each have a PN generator circuit composed of a shift register and an exclusive OR circuit as referred to previously and generates, in synchronization with a chip clock CKp from a timing signal generating part 34, a sequence of chips (the chip number N being substantially in the range of between 100 and 300, for example) of each PN code with a period Tp in a repeating cyclic order. Alternatively, it is possible to employ a construction in which a memory having stored therein the PN codes to be used is provided and the PN codes are read out from the memory in a repeating cyclic order in synchronization with the chip clock CKp. The repetition period Tp of 10 each PN code and the bit period of the signal to be spread are chosen to be the same and each bit of the input signal is spread by N chips of the PN code. In this example, the spreading code $PN_0$ is assigned to the control channel and its information is provided from the control unit 33. The modulator 37 is, for instance, a QPSK modulator, in which case, based on spread information, it modulates a carrier into a complex signal composed of an in-phase component I and a quadrature component Q. The modulated carrier is transmitted after being amplified by the amplifier 38.

In this embodiment, channels $CH_0$ through $CH_m$ for transmission from the base station 30 are respectively assigned the different spreading codes $PN_0$ through $PN_m$ of the same code length (the chip number N). The control channel $CH_0$ is used to transmit, at all times, a control signal containing information on the control channel configuration, base station identifying information, control channel information (channel numbers) of adjacent channels, paging information, etc. The communication channels $CH_1$ through $CH_m$ are used to transmit speech information to respective mobile stations from the base station 30.

In the mobile station 20, a receiver 21 synchronously detects the received wave and outputs, as a received signal $S_R$, an in-phase component I and a quadrature component Q when the mobile communication system uses the QPSK modulation scheme, for instance. A correlation detector 22 detects the magnitude of the cross-correlation between the spreading code PN corresponding to a desired channel, provided from a PN code generating part 23, and the received signal $S_R$. A desired signal level detector or intra-window receiving level detector 24A of a level detecting part 24 detects the instant when the output from the correlation detector 22 becomes maximum and the output level at that time. The level detecting part 24 further includes an interference level detector 24B characteristic of the present invention, which outputs, as an interference signal level, the value of correlation for an interference signal contained in the output from the correlation detector 22.

Figure 2:
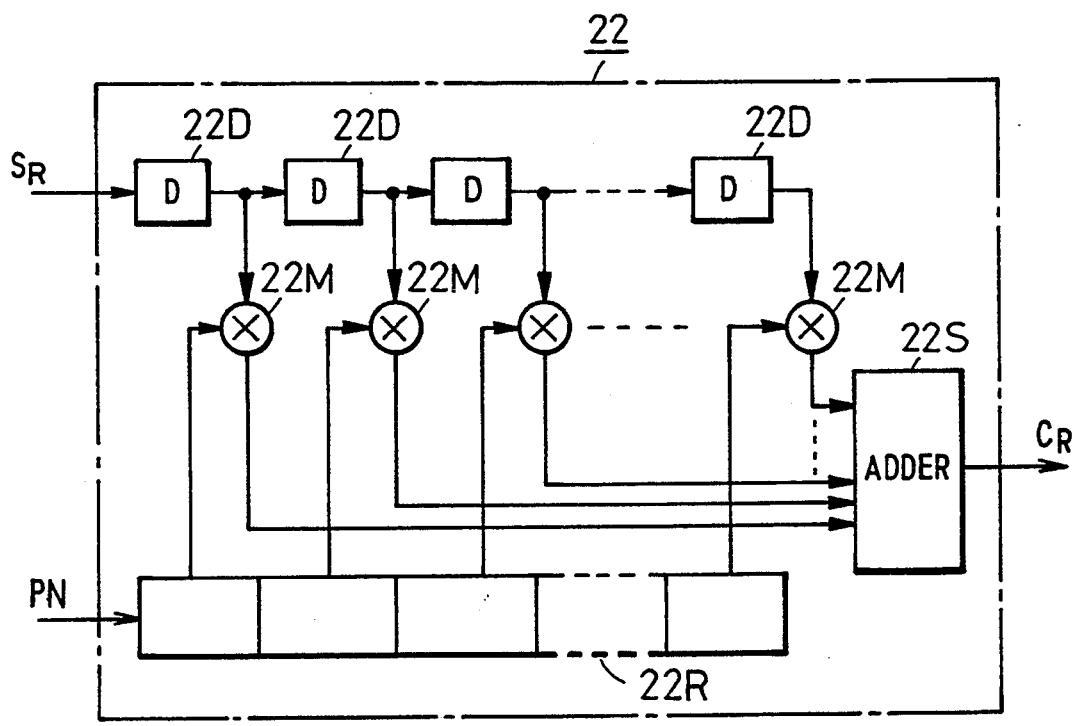
FIG. 2 is a block diagram illustrating an example of the construction of a correlation detector of the mobile station in FIG. 1.

The correlation detector 22 may be formed by such a matched filter as shown in FIG. 2. The synchronously detected output from the receiver 21 is input into N series-connected delay stages 22D (i.e. a shift register with N shift stages) and outputs from these delay stages 22D are respectively fed to N multipliers 22M, wherein they are multiplied by the values of the corresponding chips of the PN code (i.e. the spreading code) provided to an N-stage shift register 22R from the PN code generating part 23. The resulting multiplier outputs are added together by an adder 22S, whose output is provided as a correlation value $C_R$. When the communication system uses the QPSK modulation scheme, such a correlation detector 22 is provided for each of the in-phase component I and the quadrature component Q to obtain the correlation output $C_R$ individually.

Figure 3:
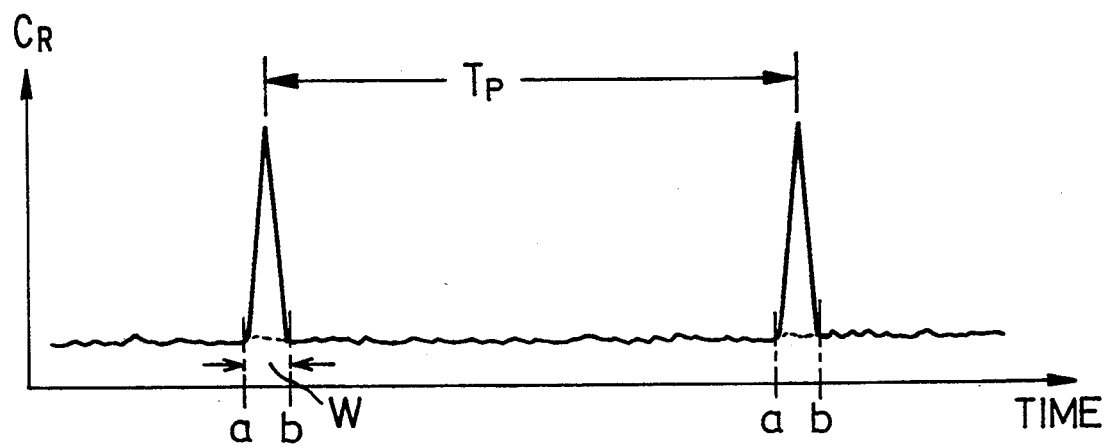
FIG. 3 is a waveform diagram showing an example of the output waveform of the correlation detector in FIG. 1.

Now, let it be assumed that the spreading code set in the shift register 22R of the correlation detector 22 is the same as the spreading code $PN_0$ that is generated by the PN code generating part $36_0$ of the base station 30 in a repeating cyclic sequence. Since the PN code generating part $36_0$ of the base station 30 generates the PN code $PN_0$ chip by chip in a repeating cyclic order, the PN code $PN_0$ becomes instantaneously in-phase with the PN code set in the shift register 22R at a certain moment in each period Tp of the PN code (i.e. the one-bit period of the signal), and at that moment the correlation between the afore-said spreading code component in the received signal and the PN code set in the shift register 22R of the correlation detector 22 becomes maximum or highest and the output level $C_R$ of the correlation detector 22 reaches its peak value as shown in FIG. 3. The output level $C_R$ becomes maximum with the period Tp. The period a–b in which the output from the correlation detector 22 reaches its peak will hereinafter be referred to as a window and the detected level in the window represents the despread received signal in the selected channel.

The inter-window receiving level detector (or desired signal level detector) 24A detects, in a search mode, the level in the window at which the output (or correlation value) $C_R$ from the correlation detector 22 becomes maximum and the detected output is provided to a control part 25. The interference level detector 24B detects the power level of the output from the correlation detector 22 outside the window and the detected output is also applied to the control part 25. The PN code generating part 23 has prestored, for example, in its internal storage (not shown) the spreading codes corresponding to the control and communication channels, for instance, and reads out a specified one of the spreading codes and sets it in the shift register 22R of the correlation detector 22 under the control of the control part 25. In a control channel receiving level measuring mode, the control part 25 fetches therein the outputs from the level detectors 24A and 24B in the case where the spreading code corresponding to the control channel of each base station is set in the shift register 22R (that is, in the case of despreading). Based on such measured data by the level detectors 24A and 24B, the control part 25 estimates a more accurate receiving level in the control channel described later on.

Next, a description will be given of the operations of the base station 30 and the mobile station 20. Control signal data for the control channel, generated in the control unit 33 of the base station 30 is spread, in the multiplier $35_0$, by the level measuring spreading code $PN_0$ from the PN code generating part $36_0$ and is combined with spread signals from the multipliers, for example, $35_1$ and $35_4$, of the currently-used communication channels, and the combined signal is superimposed on a carrier signal in the modulator 37. The modulated output signal from the modulator 37 is amplified by the amplifier 38 and then transmitted.

When placed in the initial state by turning on its power supply, the mobile station 20 needs first to identify the base station of the cell wherein it is currently located. To this end, the spreading codes corresponding to control channels of respective base stations are sequentially generated by the PN code generating part 23 and set in the shift register 22R of the correlation detector 22, then received signals from the respective base stations are despread by the spreading codes in a sequential order and the received levels of the control signals from the base stations are measured (a measurement mode). In order for the mobile station 20 to select the nearest one of the base stations, the spreading codes corresponding to the control channels of the respective cells are sequentially set in the shift register 22R and the levels of the correlation detected outputs are measured which reach their peaks in the window a–b as shown in FIG. 3, then the spreading code which provides the maximum or highest received level is selected. In practice, however, the cross-correlation between these spreading codes is not completely reduced to zero, besides the cross-correlation differs with combinations of the spreading codes. On this account, in the case where the spreading code corresponding to a certain control channel is set in the shift register 22 and the received level in the window a–b is measured, the control channel received level of another spreading code is contained in the measured received level in accordance with the value of cross-correlation between the spreading code set in the register 22R and the said another spreading code. Hence, the received level thus measured does not reflect the correct received level in the said control channel.

Then, supposing that the power of the overall interference signal component in the overall received signal despread every period Tp (i.e. the output from the correlation detector 22) is distributed uniformly throughout one cycle period Tp and that the power of the desired signal (i.e. the received signal in the control channel under measurement) mostly concentrates in the window, the received level of the desired signal in the window could be estimated as described below with reference to FIG. 3.

The total power Pw in the window a–b after despreading is expressed by the following equation:

$$Pw = \int_a^b C_{RR}^2 \, dt \qquad (1)$$

and the power Pw is obtained by adding together levels measured at respective sample points in the window a–b.

The total interference signal power $P_I$ distributed outside the window after despreading is expressed by the following equation:

$$P_I = \int_0^a C_{RR}^2 \, dt + \int_b^{Tp} C_{RR}^2 \, dt \qquad (2)$$

The ratio, W/Tp, of the width W of the window a–b to the period Tp is fixed by the design of the receiver and $W \ll Tp$ holds in general. Since it is assumed that the mean power of the interference wave component in the intra-window power Pw is equal to the mean power outside the window, the intra-window power $P_{IW}$ of the despread interference signal component can be estimated as follows:

$$P_{IW} = P_I \cdot W/(Tp - W) = P_I W/Tp \qquad (3)$$

Therefore, the level Psw of the desired signal component, from which the level of the interference signal component in the window a–b has been removed, can be expressed through approximation as follows:

$$Psw = Pw - P_{IW} = Pw - P_I W/Tp \qquad (4)$$

In this embodiment of the present invention, to calculate equation (4), the entire level (an integrated value) Pw in the window a–b after despreading, expressed by equation (1), and the entire level $P_I$ of the interference signal component outside the window, expressed by equation (2), are measured by the desired signal level detector 24A and the interference signal level detector 24 of the mobile station 20 in FIG. 1. The measured values are provided to the control part 25 and the total power Psw of the desired signal during the period Tp is calculated based on equation (4). In this way, the corrected received level of the desired signal in the control channel is obtained. Similar processing is carried out for other control channels as well. The spreading codes corresponding to them are set in the shift register 22R of the correlation detector 22 in a sequential order; their respective received levels are detected; those of the thus detected received levels which are above a predetermined threshold value are corrected through calculation as described above; and the control channel of the spreading code that provided the highest one of such corrected received levels is selected.

Figure 4:
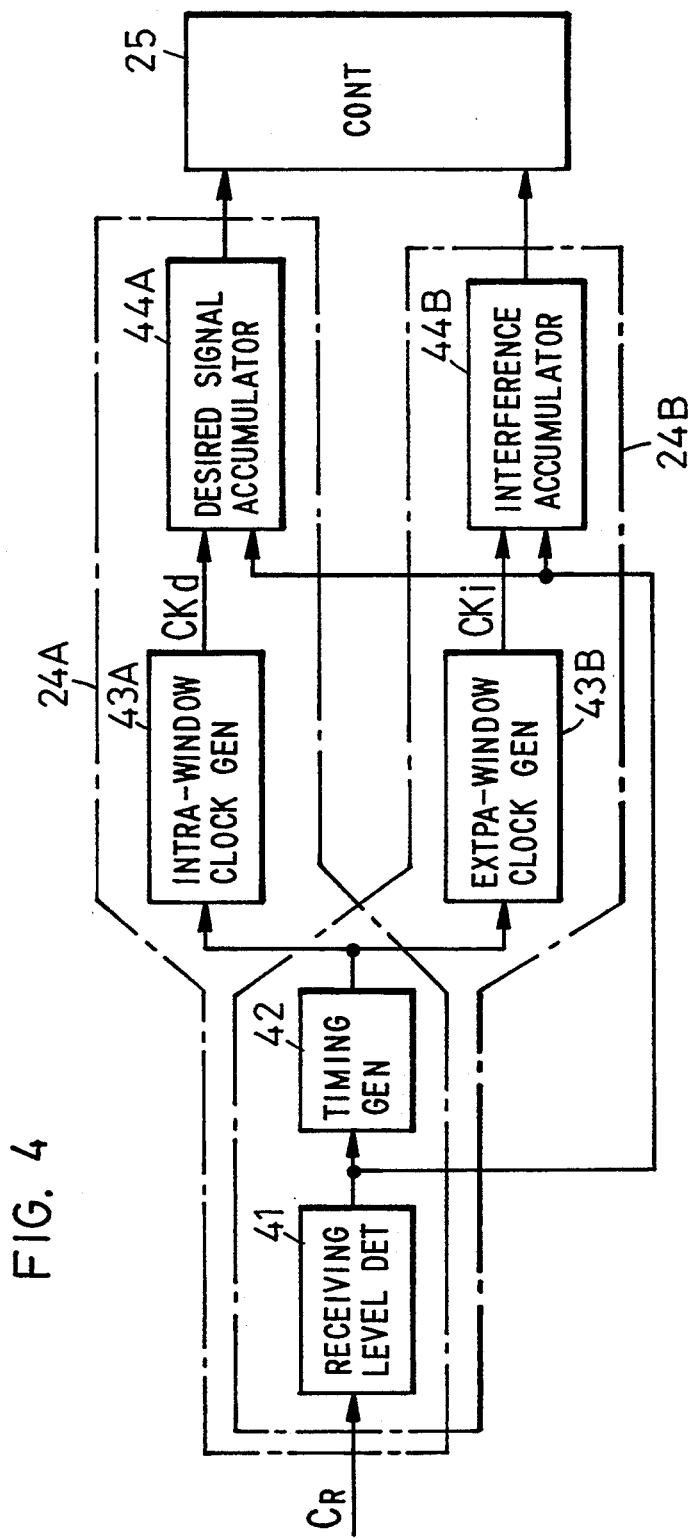
FIG. 4 is a block diagram illustrating an example of the construction of a level detecting part 24 of the mobile station in FIG. 1.

The desired signal level detector 24A and the interference level detector 24B can be constructed as shown in FIG. 4, for instance. The output $C_R$ from the correlation detector 22 is provided to a received level detecting part 41, wherein its amplitude is squared. (In the case of the QPSK scheme, the sum of squared values of the I component output $C_{RI}$ and the Q component output $C_{RQ}$, that is, $C_{RI}^2 + C_{RQ}^2$ is calculated.) The output from the received level detecting part 41 is applied to a timing generating part 42, which generates a gate signal $S_G$ of the timing that defines the window a–b of a predetermined time width (in the range of between one and several chips) centering at the instant when the received level in each period Tp reaches its peak (see FIG. 6A). At the same time, the timing generating part 42 generates a sampling clock CKs of a rate equal to or higher than the chip rate is synchronization with the peak of the received level. Such a timing generating part 42 can be configured by such a phase locked loop (PLL) as shown in FIG. 5.

Figure 5:
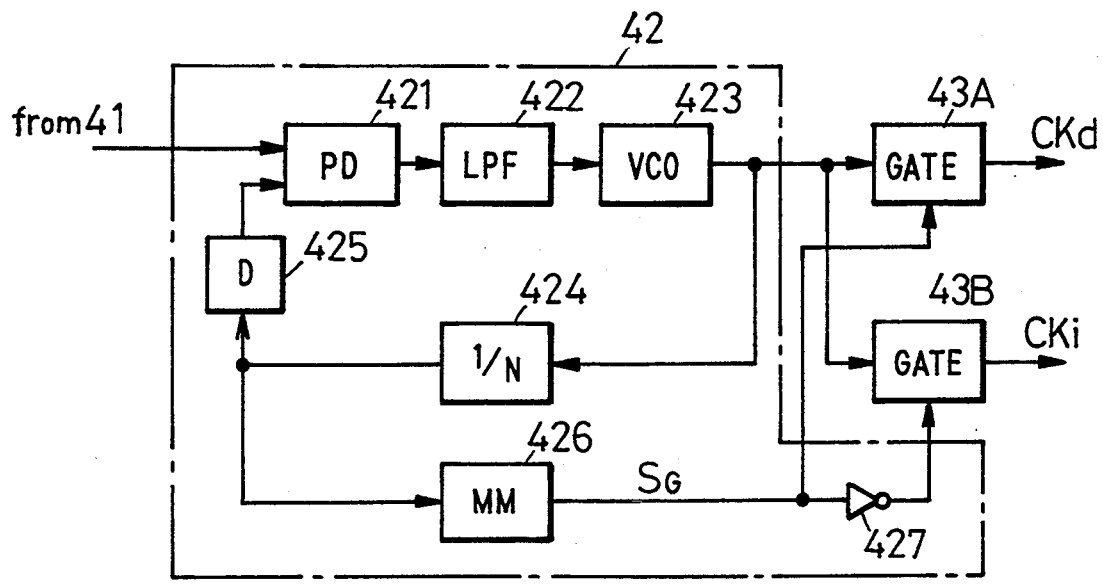
FIG. 5 is a block diagram illustrating an example of the construction of a timing generating part in FIG. 4.
Figure 6:
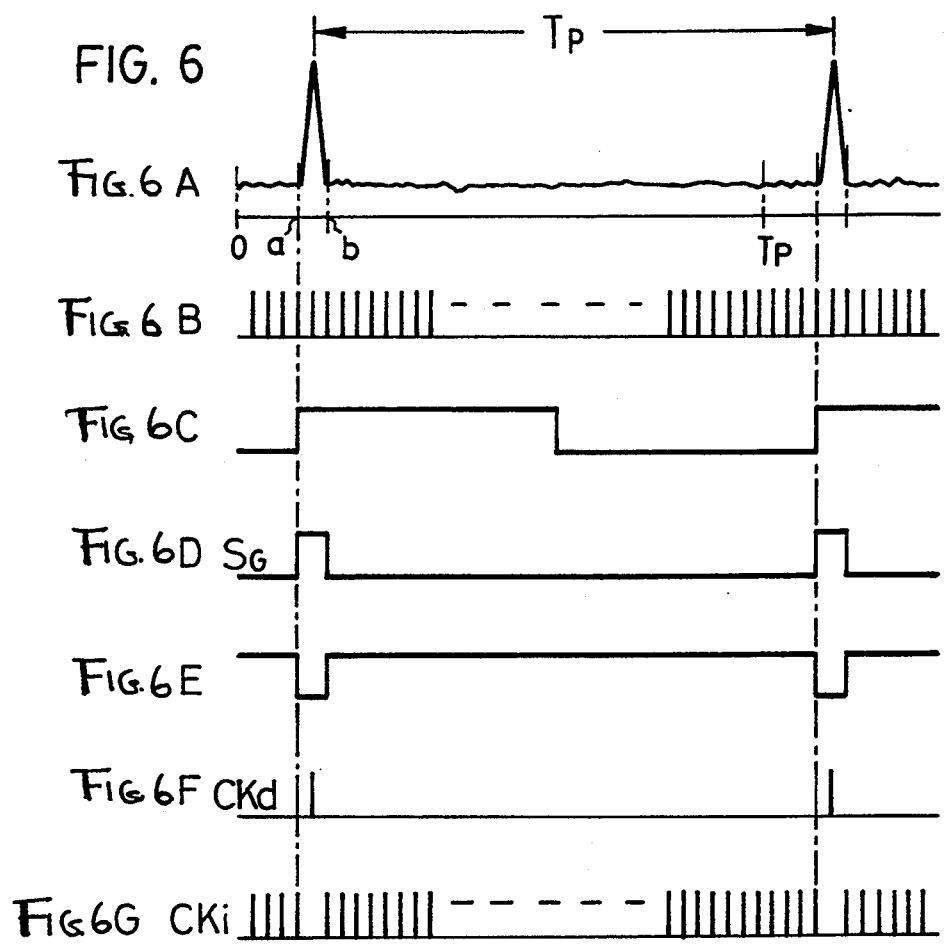
FIG. 6 (comprising FIGS. 6A–6G) is a timing chart for explaining the operation of the level detecting part 24 of the mobile station in FIG. 1.

In FIG. 5, the output from the received level detecting part 41 is applied to one input of a phase comparator 421, wherein it is compared in phase with a reference signal fed to the other input of the comparator 421. The output from the phase comparator 421 is provided via a loop filter (or low-pass filter) 422 to a VCO 423 to control its oscillation frequency F. The frequency F of the output from the VCO 323 (FIG. 6B) is divided by a frequency divider 424 down to F/N (FIG. 6C). The thus frequency-divided output is delayed by a delay element 425 for one-half the chip period Tp/N and then fed as the reference signal to the phase comparator 421. Hence, in its steady state the PLL provides a negative feedback operation to keep F/N=1/Tp, and the oscillation frequency of the VCO 423 is equal to the chip rate, that is, F=N/Tp. Accordingly, the time width of the window a–b is one chip width, at the center of which the output from the received level reaches its peak.

On the other hand, each time a one-shot multivibrator 426 is triggered, for example, by the leading or rising edge of the output from the frequency divider 424, a pulse of the same width as the chip width is generated and applied to a gate 43A as a gate signal $S_G$ shown in FIG. 6D. At the same time, the gate signal $S_G$ is also fed to a gate 43B after being inverted by an inverter 437 (FIG. 6E). As a result, the gate 43A permits the passage therethrough of the sampling clocks CKs in the window a–b of one chip width as an intra-window sampling clock CKd signal (FIG. 6F), and the gate 43B permits the passage therethrough of the sampling clocks CKs outside the window as an extra-window sampling clock CKi signal (FIG. 6G). The sampling clocks CKd and CKi having passed through the gates 43A and 43B are applied to an intra-window level or desired signal accumulator 44A and an interference signal accumulator 44B in FIG. 4, respectively. Such a PLL circuit as shown in FIG. 5 may also be formed by a digital circuit.

The desired signal accumulator 44A and the interference signal accumulator 44B are supplied with the output level of the received level detecting part 41 and accumulate the input levels for the period Tp upon each application thereto of the sampling clocks CKd and CKi. The accumulated output from the desired signal accumulator 44A becomes the aforementioned intra-window total power Pw after despreading and the accumulated output from the interference signal adder 44B becomes the total power $P_I$ of the interference signal outside the window after despreading which is expressed by the sum of the first and second terms on the righthand side of equation (3). The outputs from the accumulators 44A and 44B are applied to the control part 25. Based on these pieces of data provided thereto, the control part 25 calculates the received level of the desired control channel by equation (4) as described previously.

By subtracting the interference signal level from the received level in the window as mentioned above, the influence of the interference signal is lessened and the correct base station and consequently the visited cell can be selected. Incidentally, in the mobile station there are stored spreading codes (for level monitoring use) corresponding to the control channels of all cells in the service area. When power is turned on, the mobile station searches all the control channels and, after determination of the visited cell, stores information on the control channels of the adjoining cells obtained from the selected control channel and searches control channels for the spreading codes corresponding to the stored control channels of the adjoining cells.

While in the above description the received level of the control channel to be compared is the value obtained by subtracting the interference signal power from the total received level in the window, it is also possible to obtain, for each control channel, the ratio $Pw/P_{IW}$ between the total received level in the window expressed by equation (1) and the interference signal power $P_{IW}$ and select the control channel corresponding to the maximum one of such ratios.

As described above, according to the present invention, the total received level in the window and the interference signal level outside the window are used and the signal for comparison from which the influence of the interference signal has been removed is used as the criterion for the determination of the visited cell. Hence, the influence of the interference wave that gets mixed during measurement of the received level is eliminated—this makes the selection of the base station less faulty than in the case of measuring the received level alone. Besides, the selection of the nearest base station increases the margin of transmitting power control of the mobile station, causing an increase in the channel capacity by the transmitting power control effect.

It will be apparent that many modifications and variations may be effected without departing from the scope of the novel concepts of the present invention.

What is claimed is:

1. A mobile station for use in a code division multiple access mobile communication system in which adjoining cells are assigned different spreading codes of a predetermined period and a base station provided in each of the cells transmits a signal spectrum-spread by the spreading code assigned to that cell, said mobile station comprising:

receiving means for receiving a composite signal including a desired signal transmitted from the base station of a visited cell where said mobile station currently resides and interfering signals transmitted from the base stations in the adjoining cells, and producing a received signal;

spreading code generating means for repeatedly generating each of the spreading codes including those of the visited cell and the adjoining cells;

correlation detecting means for performing a correlation operation between each of the spreading codes and the received signal to produce a correlation output for each of the spreading codes;

first level measuring means for measuring, every said predetermined period, the level of the correlation output produced for each of said spreading codes by said correlation detecting means in a window of a predetermined time width defined in synchronization with a peak of the correlation output, said first level measuring means outputting said measured level as an intra-window received level;

second level measuring means for measuring the level of the correlation output for each of said spreading codes from said correlation detecting means outside said window in said predetermined period and outputting the measured level as an interference signal level;

calculating means which uses said intra-window received level and said interference signal level to calculate, for each of said spreading codes, a comparison signal from which the influence of the interfering signals has been removed; and control means which compares the comparison signals for the respective spreading codes with one another, and determines the one of the cells in which said mobile station is currently located based on the spreading code corresponding to the comparison signal having the highest level.

2. The mobile station of claim 1 further comprising timing generating means for generating a timing signal which defines said window in synchronization with the peak of the output from said correlation detecting means.

3. The mobile station of claim 2 wherein said first level measuring means is means for measuring the mean level of the output from said correlation detecting means in said window.

4. The mobile station of claim 1, 2, or 3 wherein said comparison signal is the ratio between said intra-window received signal and said interference signal level.

5. The mobile station of claim 1, 2, or 3 wherein said comparison signal is a signal obtained by subtracting said interference signal level from said intra-window received level.

6. A cell selecting method by a mobile station in a code division multiple access mobile communication system in which adjoining cells are assigned different level monitoring spreading codes defining level monitoring channels and a base station provided in each of the cells transmits, through a level monitoring channel, information of level monitoring spreading codes of adjoining cells in a signal spectrum-spread by the level monitoring spreading code assigned to the cell corresponding to the base station, said method comprising the steps of:

receiving said information of the level monitoring spreading codes of the adjoining cells through the level monitoring channel of a visited cell in which said mobile station currently resides and storing said information of the level monitoring spreading codes;

receiving a composite signal including a desired signal from the base station of the visited cell and interfering signals from the base stations in the adjoining cells to produce a received signal, performing correlation between the received signal and each of the level monitoring spreading codes of said adjoining cells to produce a correlation output, detecting a peak of each correlation output corresponding to each of the level monitoring spreading codes, and measuring a set of signal levels comprising a received signal level of each correlation output in a window of a predetermined width including said peak and an interference level of the correlation output outside said window;

producing, based on each set of said received signal level and said interference level obtained with each of said level monitoring spreading codes, a comparison signal in which influence by the interference level has been eliminated; and comparing the comparison signals corresponding to the respective level monitoring spreading codes, selecting a largest one of the comparison signals, and determining the one of the level monitoring spreading codes corresponding to the largest one of the comparison signals as the level monitoring spreading code assigned to a new visited cell.

7. The method of claim 6 wherein said comparison signal is a signal obtained by subtracting said interference level from said received signal level.

8. The method of claim 6 wherein said comparison signal is a signal obtained by dividing said received signal level by said interference level.

* * * * *